United States Patent [19]
Sassler

[11] 3,991,372
[45] Nov. 9, 1976

[54] CIRCUIT FOR REVERSING DOPPLER SIGNAL MODIFYING A CARRIER

[75] Inventor: Marvin L. Sassler, Wayne, N.J.

[73] Assignee: The United States of America as represented by the Secretary of the Navy, Washington, D.C.

[22] Filed: Sept. 24, 1975

[21] Appl. No.: 616,339

[52] U.S. Cl. .................................. 325/435; 325/4; 325/17; 325/421; 343/179
[51] Int. Cl.² ........................ H04B 1/12; H04B 3/60
[58] Field of Search ....... 325/4, 9, 11, 17, 418–421, 325/63, 430, 65, 435, 438; 343/7.5, 113 DE, 175, 179

[56] References Cited
UNITED STATES PATENTS

| | | | |
|---|---|---|---|
| 3,450,842 | 6/1969 | Lipke | 325/4 |
| 3,766,481 | 10/1973 | Rodgers | 325/420 |
| 3,800,231 | 3/1974 | Pratt | 325/420 |
| 3,864,634 | 2/1975 | Dragonetti | 325/17 |

*Primary Examiner*—Robert L. Griffin
*Assistant Examiner*—Marc E. Bookbinder
*Attorney, Agent, or Firm*—R. S. Sciascia; L. I. Shrago

[57] ABSTRACT

A doppler signal modifying a carrier wave has its sign reversed by a circuit which includes a pair of signal sources whose frequencies are above and below that of the carrier by equal amounts. The original signal and one of these sources control a first flip-flop, while the other source and a voltage controlled oscillator, whose frequency is normally set to that of the carrier, control a second flip-flop. The square waves thus produced, which have frequencies corresponding to the difference in frequency between the control signals, are applied in particular combinations to a pair of exclusive OR gates, whose outputs are integrated and then combined in opposition to develop an error signal which controls the voltage controlled oscillator. The output of this oscillator, when this error signal is minimized, is the desired signal.

6 Claims, 1 Drawing Figure

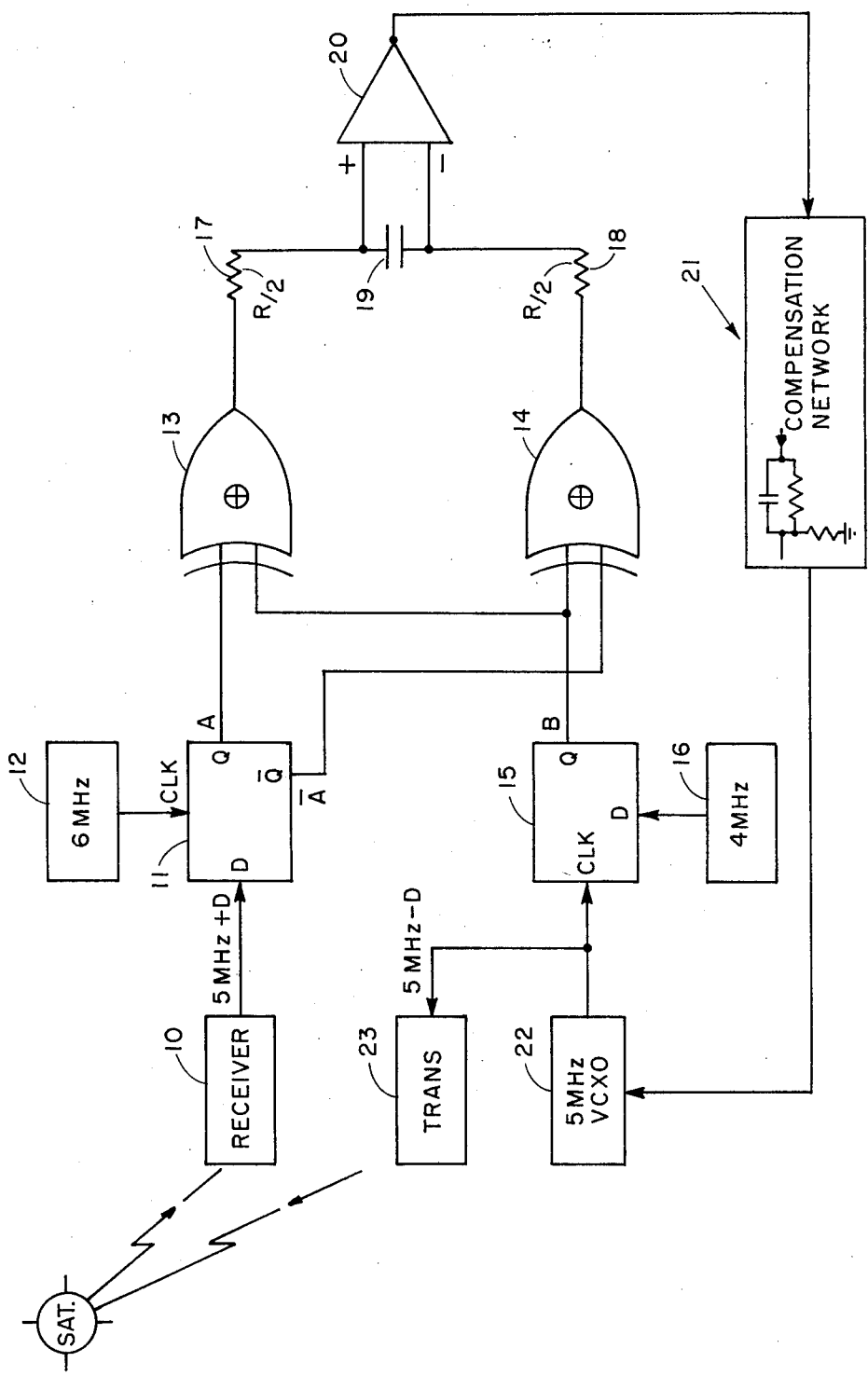

CIRCUIT FOR REVERSING DOPPLER SIGNAL MODIFYING A CARRIER

The present invention relates generally to satellite communication systems and, more particularly, to a method and apparatus for effectively compensating for the doppler frequency shift introduced into the communication channel by the motion of a ground terminal.

Data signals related from orbiting satellites contain doppler frequency shift components caused by the motion of the satellite and that of any of its ground terminals. In the case of a shipboard terminal, for example, the doppler frequency shift, which may be in the kilocycle range at X band, has the effect of adding a random modulation to its transmitting station which degrades the error performance of the overall communication system. This effect may be counteracted by measuring the doppler shift in the downward path transmission from the satellite, inverting this doppler shift and applying it to the upward path transmission to the satellite.

It is, accordingly, a primary object of the present invention to provide a method for inverting a variable doppler frequency component present in a signal.

Another object of the present invention is to provide a low-cost digital circuit arrangement which can replace a doppler frequency shift signal of one sign that is present along with a signal of a known frequency with an equal doppler frequency shift signal of an opposite sign.

Another object of the present invention is to provide an arrangement which can process a signal consisting of a constant frequency component and a variable doppler frequency shift component and produce therefrom a signal consisting of the same constant frequency component but with an inverted doppler frequency shift component.

Other objects, advantages and novel features of the invention will become apparent from the following detailed description of the invention when considered in conjunction with the accompanying drawing where the single FIGURE illustrates a preferred embodiment of the invention.

Referring now to this FIGURE, it will be seen that the shipboard satellite terminal includes as one component thereof a tracking receiver generally represented by reference character 10 which has a suitable antenna for receiving the beacon signal transmitted from an orbiting satellite which may be, for example, a 7.25 – 7.75 GHz carrier with 800 Hz bi-phase modulation. The signal so detected, it will be appreciated, contains a doppler shift component due to the relative motion of the satellite and the ship, and this composite signal is processed by conventional techniques which may involve frequency down conversion and signal shaping to yield a 5 MHz signal accompanied by an equivalent doppler frequency shift, + D. This signal, which is in a binary format with the 1 and 0 logic levels matching those of the other logic circuits used in the follow-on circuits of the system, is fed to the D terminal of a flip-flop 11. This flip-flop, which is a so-called D type circuit, is characterized by the fact that it develops at one of its output terminals Q, for example, a square wave whose frequency corresponds to the difference frequency between that of the square wave present at its D terminal and the controlled signal present at its clock terminal. The details of such a flip-flop circuit are disclosed in a Motorola application booklet entitled, "Phase Locked Loop Systems" 2nd edition, August 1973, and, more particularly, on page 11 thereof wherein the subject "Digital Mixing" is discussed. The signal fed to the clock terminal of this flip-flop is obtained from a 6 MHz stabilized local oscillator 12.

The difference signal, A, appearing at terminal Q of flip-flop 11 is fed to one input of an exclusive OR gate 13, while an inverted version of this difference signal, $\overline{A}$, simultaneously appearing at terminal $\overline{Q}$ is fed to one input of a second exclusive OR gate 14.

The other input to these gates, B, is obtained from the Q terminal of a second flip-flop 15, similar in construction to flip-flop 11, which has a square wave signal of 4 MHz connected to its D terminal obtained from stabilized local oscillator 16 and suitably shaped by appropriate circuits, not shown.

The frequency of oscillators 12 and 16 are selected so that they are spaced by equal amounts above and below the 5 MHz frequency, the nominal value of the incoming signal after frequency reduction in the absence of any doppler shift component. Thus, instead of being 6 MHz and 4 MHz, respectively, these frequencies could be 6.66 MHz and 3.33 MHz, which values would perhaps be more desirable since they could be readily obtained from a common source so as to possess generally a synchronous relationship.

The outputs of the exclusive OR gates 13 and 14 are coupled via equal series resistors 17 and 18 to opposite sides of a capacitor 19. This RC network effectively integrates and oppositely combines the two output signals from the exclusive OR gates, and the signal representing the difference therebetween, the voltage existing across capacitor 19, provides the input to an operational amplifier 20.

This amplifier responds to this difference signal and cancels out any drift due to variations in the logic levels or the logic supply voltage. Additionally, it also provides the necessary DC loop gain required to reduce the phase error of the voltage controlled local oscillator present in the control loop to a specified value.

The output from amplifer 20 is coupled to a compensation network 21 and then to the control terminal of a voltage controlled local oscillator 22 which has a nominal frequency of 5 MHz so as to match the frequency reduced signal from receiver 10 in the absence of any doppler shift component. Compensation network 21, which is required to stabilize the feedback loop and provide phase and gain margin, in its simplest form, may consist of an L-shaped network with the series arm thereof made up of a resistor and capacitor in parallel and the shunt arm a resistor to ground at the output side of this combination.

The output of voltage controlled oscillator 22 is applied to the clock terminal of flip-flop 15 and, also, since it is the signal desired in a reduced frequency form, to transmitter 23 for transmission up to the orbiting satellite.

In the operation of the above-described circuit, consider first the case where there is no doppler shift signal associated with the 5 MHz signal so that the output of flip-flop 11 is a binary signal at 1 MHz. At this time, provided the voltage controlled oscillator 22 is also at 5 MHz, the output from flip-flop 15 will be a similar binary wave form at the 1 MHz frequency. Each of the exclusive OR gates 13 and 14, as is well known, produce a logic 1 condition at their output circuit provided one and only one of its two inputs is a logic 1. Because of this performance, these circuits sometimes are called inequality detectors. Thus, they produce a logic 1 only when their two inputs are at opposite logic states. All other times, they produce a 0 logic condition.

Since, in the case now being discussed, the two square waves have the same frequency, if they are in phase, then the outputs of these exclusive OR gates will persist at opposite logic conditions. The 1 logic condition will consistently appear at the output of gate 14 since this gate, it will be recalled, has an inverted square wave obtained from the $\overline{Q}$ terminal as one of its inputs. Likewise, if these similar square waves are out of phase, the same opposite logic conditions will be present at the outputs of the exclusive gates, but this time, the logic condition 1 will occur at the output of exclusive gate 13.

It can be shown that when these square waves are in-phase quadrature, opposite logic conditions will exist at the outputs of gates 13 and 14 for equal half periods of each square wave. In other words, out-of-phase square waves having a frequency of 2 MHz will be present. Since the action of resistors 17 and 18 and capacitor 19 is to, in effect, separately integrate these gate outputs and provide a difference voltage therefrom, this RC network will produce a 0 amplitude error signal when the square waves are in a quadrature relationship and a maximum amplitude error signal when the square waves are in or out of phase. The error signal so developed after suitable amplification in circuit 20 and appropriate smoothing serves as the controlled signal for voltage controlled oscillator 22 to, if effect, lock the tracking loop to the 5 MHz input signal. The error signal thus employed, it will be appreciated, has an amplitude proportional to the relative phase of the two square waves with the minimum signal occurring when a 90° phase relationship exists and a maximum signal of one sign or another occurring when these signals are in and out of phase.

Consider now the case of interest where there is, for example, a positive doppler shift + D associated with the 5 MHz signal. Now the output of flip-flop 11 will have a square wave at 6 MHz - (5 MHz - D) or 1 MHz - D. With the voltage controlled oscillator 22 still set at 5 MHz, the output from flip-flop 15 will remain at the 1 MHz frequency. It can be shown that with binary waveforms of different frequencies now appearing at the two inputs of the exclusive OR gates 13 and 14, these gates will develop a binary waveform whose duty cycle varies from 0 to 100 percent at a rate equal to the difference frequencies of these two square waves. When each of these waveforms is effectively integrated in the RC network, a triangular waveform at the difference frequency results. When these waveforms are combined in capacitor 19, an error signal is produced. This error signal, like previous error signals above-described, after suitable smoothing is applied to voltage controlled oscillator 22 to lower its frequency from its nominal 5 MHz value. As this frequency is lowered, it will be appreciated, the frequency of the square wave output of flip-flop 15 follows it, dropping from its previous 1 MHz value. This action continues around the loop until oscillator 22 reaches the frequency 5 MHz - D. When this happens, the output of flip-flop 15 becomes (5 MHz - D) - 4 MHz or 1 MHz - D, which frequency now corresponds to that of the square wave from flip-flop 11.

The system is now essentially in lock, and it stabilizes when a quadrature phase relationship exists between these square waves, now of equal frequency. This condition is indicated when the error signal in the loop decreases to 0. Thus, the system comes to rest with the desired signal, the 5 MHz - D present at the output of voltage controlled oscillator 22 and at the input of transmitter 23.

In the corresponding case where the 5 MHz signal has a negative doppler shift component associated with it, then the system operates in essentially the same manner as described above but with an error signal of opposite sign so that the voltage controlled oscillator 22 has its frequency increased until it reaches the 5 MHz + D value. At this frequency, the two square waves at the inputs of the exclusive OR gates 13 and 14 equal 1 MHz + D and the system, thereafter, stabilizes when these signals attain a quadrature relationship.

What is claimed is:

1. A system for converting an input signal having a frequency $f + D$ to an output signal $f - D$ or an input signal $f - D$ to an output signal $f + D$ where $f$ is a constant value and $D$ is a variable value comprising, in combination means for generating signals having frequencies $f + K$ and $f - K$ where $K$ is a constant value and greater than $D$;

means controlled by said input signal and the signal $f + K$ for generating a first square wave and a second square wave which is 180° out of phase with said first square wave, both of said square waves having a frequency which is equal to the difference in frequency between said input signal and the signal $f + K$;

a voltage controlled oscillator generating an output signal of frequency $f$ in the absence of an error signal at its control terminal;

means controlled by the signal $f - K$ and the output signal of said voltage controlled oscillator for generating a third square wave having a frequency which is equal to the difference in frequency between the signal $f - K$ and the output of said voltage controlled oscillator;

means for multiplying said first and third square waves together to form a first product signal and said second and third square waves together to form a second product signal;

means for deriving from said product signals an error signal whose magnitude and sign indicate the difference between said product signals; and means for applying said error signal to the control terminal of said voltage controlled oscillator so as to shift its frequency by an amount and in a direction such that said error signal is minimized, the output of said voltage controlled oscillator when said error signal is minimized being the output signal $f - D$ or $f + D$ depending upon whether the input signal to be converted is $f + D$ or $f - D$, respectively.

2. In an arrangement as defined in claim 1 wherein said means for deriving said error signal includes means for integrating said product signals and for combining the results therefrom in an opposite manner.

3. In an arrangement as defined in claim 1 wherein said means for generating said first and second square waves comprises a D type flip-flop having a pair of output terminals at which out-of-phase square waves appear.

4. In an arrangement as defined in claim 1 wherein said means for multiplying said first and third square waves together and said second and third square waves together includes a pair of exclusive OR gates having the signals which are to be multiplied applied to a pair of input terminals thereof.

5. A system for converting a first signal which is in the form of a carrier frequency combined with a doppler frequency of a particular sign to a second signal in the form of the same carrier frequency combined with the same doppler frequency but of an opposite sign comprising, in combination a first signal source of a fixed frequency which differs from said carrier frequency by a predetermined amount in a first direction;

a second signal source of a fixed frequency which differs from said carrier frequency by the same predetermined amount but in an opposite direction from that of said first signal source;

a pair of flip-flops of the type having first and second output terminals at which a square wave and an inverted square wave appear respectively, whose frequency corresponds to the difference in frequency between a pair of signals that are applied to a pair of its control terminals;

a voltage controlled oscillator whose frequency is normally set to that of said carrier frequency;

a pair of exclusive OR gates;

means for coupling said first signal which is to be converted and said first signal source to different control terminals of one of said flip-flops;

means for coupling the square wave appearing at the first output terminal of said one flip-flop to one input of one of said exclusive OR gates;

means for connecting the inverted square wave appearing at the second output of said one flip-flop to one input of the other exclusive OR gate;

means for coupling the output of the voltage controlled oscillator and said second signal source to different control terminals of the other flip-flop;

means for coupling the square wave appearing at the first output terminal of said other flip-flop to both other inputs of said pair of exclusive OR gates;

means for integrating the outputs of said exclusive OR gates and for developing an error signal whose magnitude and sign is indicative of the difference therebetween; and means for applying said error signal to the control terminal of said voltage controlled oscillator so as to change its frequency by an amount and in a direction such as to minimize said error signal, the output of said voltage controlled oscillator when said error signal is minimized corresponding to said second signal.

6. In an arrangement as defined in claim 5 a compensation network consisting of a first resistor and a capacitor in parallel with a second resistor connected between one side of said parallel combination and a reference potential; and means for applying said error signal between the other side of said parallel combination and said reference potential, the signal appearing across said second resistor being the signal applied to the control terminal of the voltage controlled oscillator.

* * * * *